Aug. 23, 1932.  W. F. BROWN  1,873,280
LAMINATED GLASS
Original Filed June 28, 1926
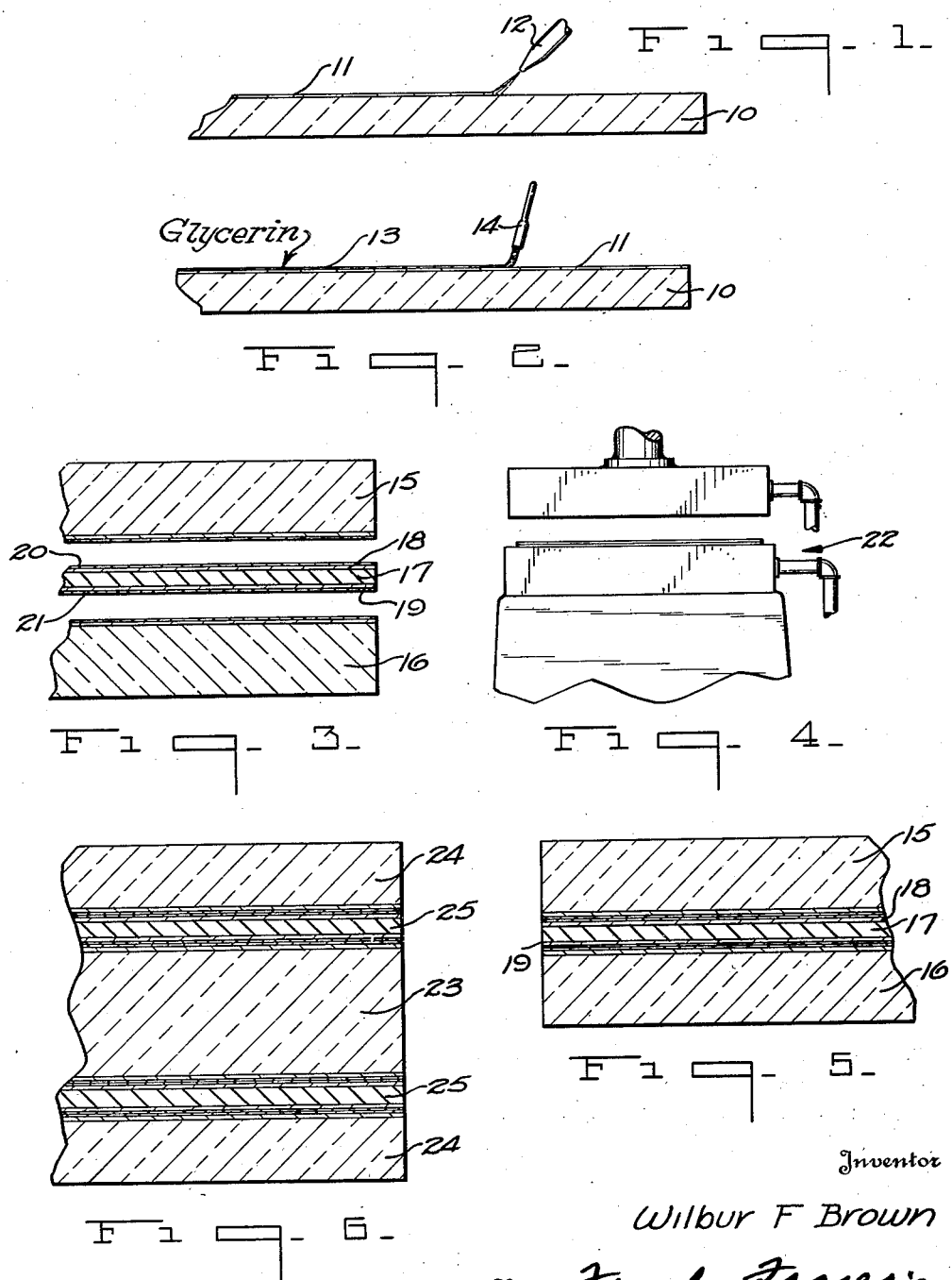

Patented Aug. 23, 1932

1,873,280

UNITED STATES PATENT OFFICE

WILBUR F. BROWN, OF TOLEDO, OHIO, ASSIGNOR TO LIBBEY-OWENS-FORD GLASS COMPANY, OF TOLEDO, OHIO, A CORPORATION OF OHIO

LAMINATED GLASS

Application filed June 28, 1926, Serial No. 118,985. Renewed December 11, 1930.

The present invention relates to laminated glass, and to the process of producing the same.

An important object of the invention is to provide a process for producing, as a new article of manufacture, a sheet of laminated glass, and contemplates the use of glycerin in obtaining a suitable bond between the laminations.

Another object of the invention is to provide a process of this nature wherein a sheet or sheets of glass may be provided with a skin of material such as cellulose composition material, which skin may be provided with a film of glycerin permitting the sheet of glass and skin to be effectively and permanently united to a sheet of nonbrittle material.

Other objects and advantages of the invention will become apparent during the course of the following description.

In the drawing wherein like numerals are employed to designate like parts throughout the same, Fig. 1 illustrates diagrammatically the formation of a skin on a sheet of glass, Fig. 2 illustrates diagrammatically the application of a film of glycerin on the skin, Fig. 3 shows in section the laminations after they have been treated and before they have been united, Fig. 4 is a diagrammatic representation of a press used for uniting the laminations, Fig. 5 is a fragmentary sectional view of the finished product, and Fig. 6 is a similar view of another form of product.

The numeral 10 designates a sheet of glass, the said sheet preferably being transparent. A skin 11 may be formed on the sheet of glass by means of a spray or the like 12. The skin is preferably a cellulose composition material, and as shown is applied by dissolving the material in a suitable solvent. After the liquid has been sprayed on the sheet of glass 10 or otherwise applied, it is permitted to dry so that practically all solvents may be removed, leaving a relatively dry skin of material closely adhering to the sheet of glass.

In Fig. 2 a film of glycerin 13 is being applied to the skin 11 on the sheet of glass 10. The film of glycerin may be applied by means of a brush 14, or it may be sprayed on.

To produce a sheet of non-brittle glass, two sheets of glass 15 and 16, shown in Fig. 3, are united to a sheet of non-brittle material 17. The non-brittle material 17, which may be any of the well known cellulose composition materials, may also be provided with a skin or skins 18 and 19, which can be coated with films of glycerin 20 and 21. After the sheets of glass have been treated in this manner the three laminations are superimposed and placed in a press designated by the numeral 22 and illustrated diagrammatically in Fig. 4. The laminations are here subjected to the action of heat and pressure, the pressure being applied preferably centrally thereof first so that excess glycerin will be expelled from between said laminations.

In Fig. 5 is illustrated in section the finished product. It is of course to be understood that the thickness of the films are exaggerated, as the amount of glycerin remaining between the laminations will be very little.

In Fig. 6 is shown a sheet of so-called bullet proof glass, comprising a central relatively thick sheet 23, two outer sheets 24, and sheets of non-brittle material 25, which are united in accordance with the present invention. The sheet of non-brittle material need not necessarily be a cellulose composition material, as any material having substantially the same properties may be used.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. As a new article of manufacture, a sheet of laminated glass including a sheet of glass having a skin of material thereon which has been coated with a film of glycerin.

2. As a new article of manufacture, a sheet of laminated glass including a sheet of glass having a skin of cellulose composition material thereon which has been treated with a film of glycerin.

3. As a new article of manufacture, a sheet of laminated glass comprising a sheet of glass, a skin thereon, a film of glycerin, and a sheet of non-brittle material.

4. As a new article of manufacture, a sheet of laminated glass comprising two sheets of glass and a sheet of non-brittle material, and a film of glycerin interposed between the two sheets of glass and sheet of non-brittle material.

5. As a new article of manufacture, a sheet of laminated glass comprising a plurality of laminations bonded together by means of glycerin.

6. As a new article of manufacture, a sheet of laminated glass comprising two sheets of glass and a sheet of cellulose ester united by a bonding material including glycerin.

Signed at Toledo, in the county of Lucas, and State of Ohio, this 24th day of June, 1926.

WILBUR F. BROWN.